United States Patent [19]
Yap

[11] Patent Number: 5,383,782
[45] Date of Patent: Jan. 24, 1995

[54] GAS-LANCE APPARATUS AND METHOD

[75] Inventor: Loo T. Yap, Princeton, N.J.

[73] Assignee: The BOC Group, Inc., New Providence, N.J.

[21] Appl. No.: 50,938

[22] Filed: Apr. 21, 1993

[51] Int. Cl.⁶ .............................................. F27B 3/22
[52] U.S. Cl. .............................. 432/22; 431/10; 431/190; 431/159; 432/195; 432/196; 432/10
[58] Field of Search ............... 432/195, 196, 19, 22, 432/111, 10; 431/10, 190, 159

[56] References Cited

U.S. PATENT DOCUMENTS

| | | | |
|---|---|---|---|
| 1,736,675 | 11/1929 | Steese | 432/22 |
| 2,308,902 | 1/1943 | Weller | 432/22 |
| 3,074,707 | 1/1963 | Humphries et al. | 432/19 |
| 3,488,700 | 1/1970 | Iken et al. | 432/111 |
| 3,523,781 | 8/1970 | Leveque | 432/22 |
| 3,620,514 | 11/1971 | Geiger, Jr. | 432/22 |
| 4,909,733 | 3/1990 | Yap | 432/195 |
| 4,927,357 | 5/1990 | Yap | 432/22 |

Primary Examiner—Henry C. Yuen
Attorney, Agent, or Firm—David M. Rosenblum; Larry R. Cassett

[57] ABSTRACT

A gas-lance apparatus and method for injecting a rate-enhancing gas between a flame and a thermal load to augment combustion of fuel undergoing combustion in the flame. A fan-shaped main jet is introduced between the flame for producing a low pressure field of the rate-enhancing gas between the flame and the thermal load. The low pressure field deforms the flame into the shape of the main jet and draws the flame toward the thermal load. The main jet decays along its length due to entrainment of combustion-environment gas in the main jet. In order to delay such decay, a fan-shaped booster jet of rate-enhancing gas is introduced between the main jet and the thermal load. The booster jet has a higher velocity than the main jet and is positioned adjacent to the main jet.

5 Claims, 2 Drawing Sheets

GAS-LANCE APPARATUS AND METHOD

BACKGROUND OF THE INVENTION

The present invention relates to a gas-lance apparatus and method for injecting a rate-enhancing gas between a flame and a thermal load to augment combustion of the fuel undergoing combustion in the flame. More particularly, the present invention relates to such a gas-lance apparatus and method in which fan-shaped main and booster jets of the rate-enhancing gas are introduced between the flame and the thermal load to deform the flame into the shape of the main jet and to draw the flame in the direction of the thermal load.

Many industrial processes involve burning a fuel to heat a thermal load such as a melt composed of, for instance, metals, ferric and non-ferric, glass, and etc. In order to increase the heat transfer to the thermal load, it is also known to inject a rate-enhancing gas, such as oxygen or oxygen-enriched air into the fuel. Burners that employ a rate-enhancing gas in the combustion of a fuel are known in the art as oxy-fuel burners.

The problem with oxy-fuel burners is that the heat transfer tends to be relatively concentrated, and as a result, hot spots tend to develop in the melt. In order to prevent this, gas-lancing method and apparatus have been provided in the prior art. A prior art gas-lancing method and apparatus is illustrated in U.S. Pat. No. 4,927,357. In such gas-lancing method and apparatus, rate-enhancing gas is injected between a burner or a fuel nozzle and a melt by way of an oxidant nozzle which imparts a fan-shaped configuration to the rate-enhancing gas jet. This fan-shaped rate-enhancing gas jet produces a low pressure field which tends to attract the flame towards the melt while deforming the flame toward the shape of the fan-shaped rate-enhancing gas jet. This produces burning over a wide area with more homogeneous heat transfer which avoids any hot spots developing in the melt.

A problem with prior art gas-lancing is that the jet of rate-enhancing gas tends to decay over its length due to entrainment of combustion-environment gas. As a result, the degree to which the flame eminating from the fuel jet or burner can be influenced is somewhat limited.

SUMMARY OF THE INVENTION

The present invention provides a method and apparatus by which the degree to which the flame can be influenced by the low pressure field of rate-enhancing gas can be increased over that possible in the prior art. In one aspect, the present invention provides a lance for injecting a rate-enhancing gas between a flame and a thermal load such as a melt to augment combustion of fuel undergoing combustion in the flame. The lance comprises a means for introducing a fan-shaped main jet between the flame and the thermal load. The main jet produces a low pressure field of the rate-enhancing gas beneath the flame to deform the flame into the shape of the main jet and to draw the flame toward a thermal load. The main jet decays along its length due to entrainment of combustion-environment gas in the main jet. A means is provided for introducing a horizontally divergent, fan-shaped booster jet of rate-enhancing gas between the main jet and the thermal load. The booster jet has a higher velocity than the main jet and is positioned adjacent to the main jet to delay the decay of the main jet.

In another aspect, the present invention provides a method of injecting a rate-enhancing gas between a flame and a thermal load to augment combustion of fuel undergoing combustion in the flame. The method comprises introducing a fan-shaped main jet between the flame and the thermal load. The main jet produces a low pressure field of the rate-enhancing gas between the flame and the thermal load to deform the flame into the shape of the main jet and to draw the flame toward the thermal load. The main jet decays along its length at a rate of decay due to the entrainment of combustion-environment gas in the main jet. A fan-shaped booster jet of rate-enhancing gas is introduced below the main jet. The booster jet has a higher velocity than the main jet and is introduced adjacent to the main jet to delay the decay of the main jet.

BRIEF DESCRIPTION OF THE DRAWINGS

Although the specification concludes with claims distinctly pointing out the subject matter that Applicant regards as his invention, it is believed that the invention will be better understood when taken in connection with the accompanying drawings in which:

DETAILED DESCRIPTION OF THE INVENTION

Figure 1:
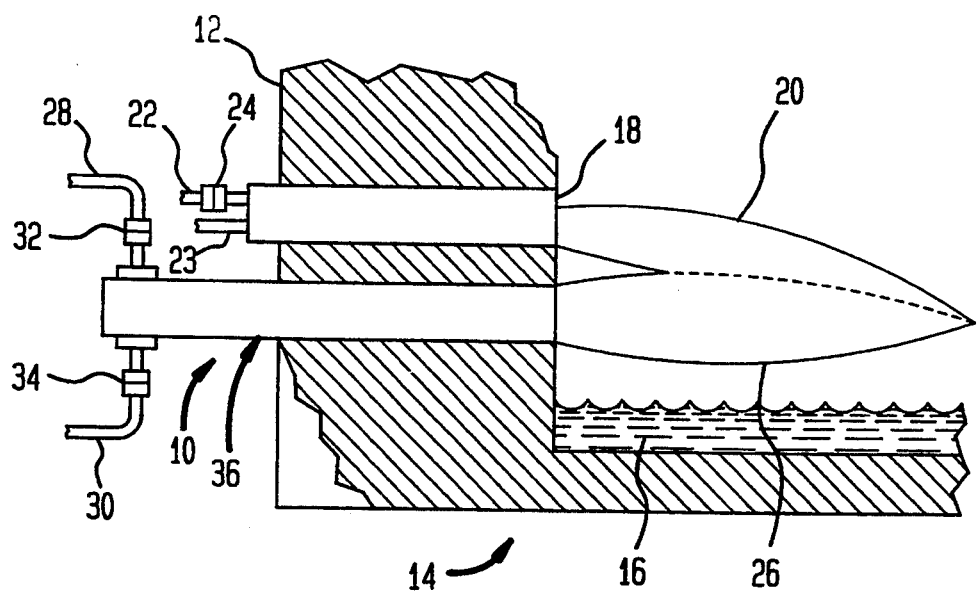
FIG. 1 is a fragmentary, elevational view of a burner and lance of the present invention set within a furnace being used to heat a melt. Portions of the furnace are broken away in order to expose the burner, lance, flame pattern and relationship of melt to the flame pattern.
Figure 2:
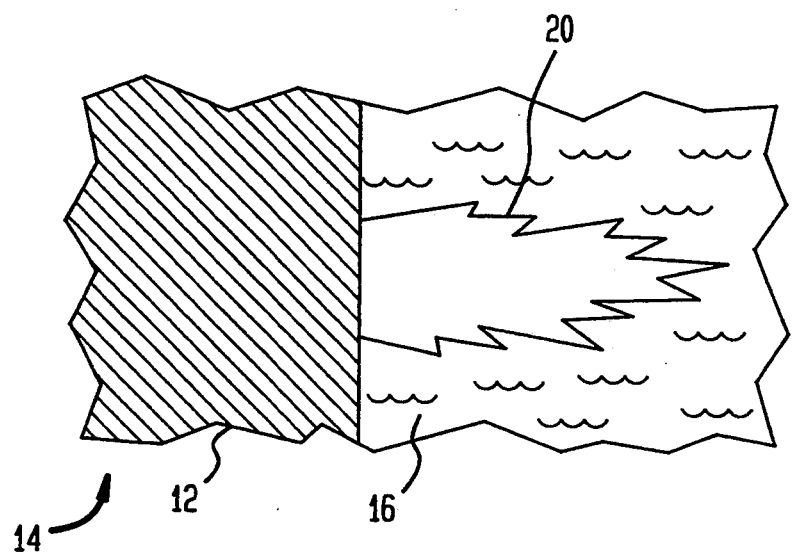
FIG. 2 is a top plan view of FIG. 1.

With reference to FIGS. 1 and 2 a lance 10 in accordance with the present invention is illustrated set within a sidewall 12 of a furnace 14 which is being used to heat a melt 16 contained within furnace 14. A burner 18 of a type known in the art is set within sidewall 12 of a furnace 14 and produces a flame 20. Fuel is supplied to burner 18 by a fuel line 22 which is connected to burner 18 through a quick connect-disconnect fitting 24 well known in the art. Air is supplied through an air line 23.

As illustrated, flame 20 is deformed or distorted into a fan-shaped configuration. The configuration of flame 20 is imparted by a rate-enhancing gas 26 being introduced below flame 20 by lance 10. In this regard, oxygen or oxygen-enriched air, which forms the rate-enhancing gas, is introduced through oxidant lines 28 and 30 which are connected to lance 10 through the use of quick connect-disconnect type fittings 32 and 34, respectively. The oxidant is injected so as to produce a fan-shaped low pressure field of the underlying flame 20 and this low pressure field attracts flame 20 towards oxidant jet 26, and therefore, toward melt 16. Additionally, flame 20 is distorted toward the shape of oxidant jet 26.

As can best be seen in the figures, the rate-enhancing gas jet is "fan-shaped" and such term as used herein and in the claims means the jet of rate-enhancing gas or flame outwardly diverges at essentially a constant angle along a single plane and with very little divergence in a perpendicular plane. For instance, along the length of the oxidant jet, greater divergence occurs in a horizontal plane than in a vertical plane.

A combustion-environment gas, such as air, however, is being entrained in the oxidant jet. This entrainment limits the degree to which the underlying oxidant jet can affect the flame because the oxidant jet decays. In the illustrated embodiment, although there is decay as one moves along the length of the oxidant jet, this decay is far less than would occur with an oxidant jet of the prior art. Thus, the present invention can be said to reduce the rate of decay of an oxidant jet.

Figure 3:
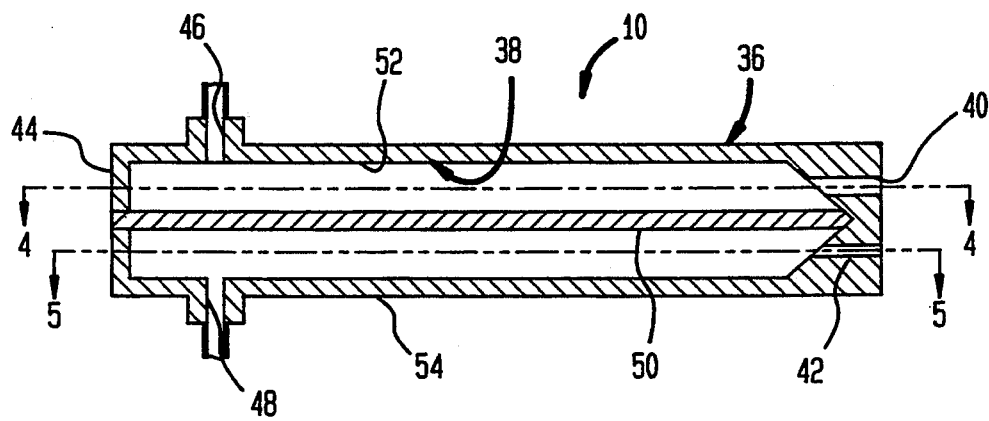
FIG. 3 is a cross-sectional side view of a lance in accordance with the present invention.
Figure 4:
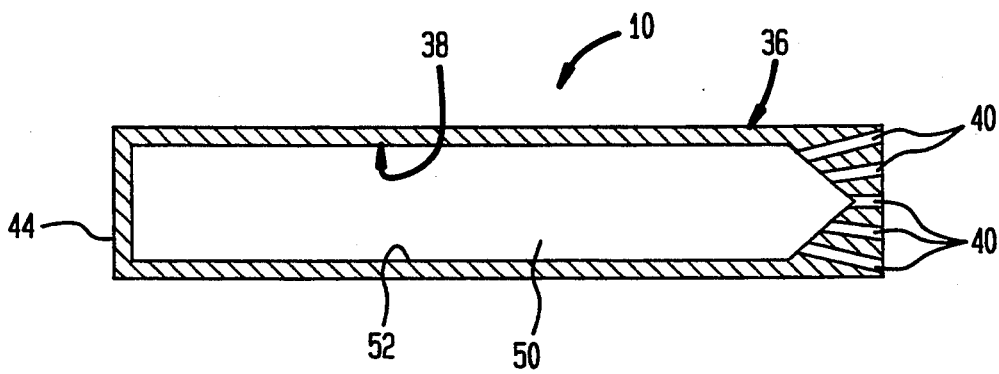
FIG. 4 is a cross-sectional view of the lance illustrated in FIG. 1 taken along line 4—4 of FIG. 3.
Figure 5:
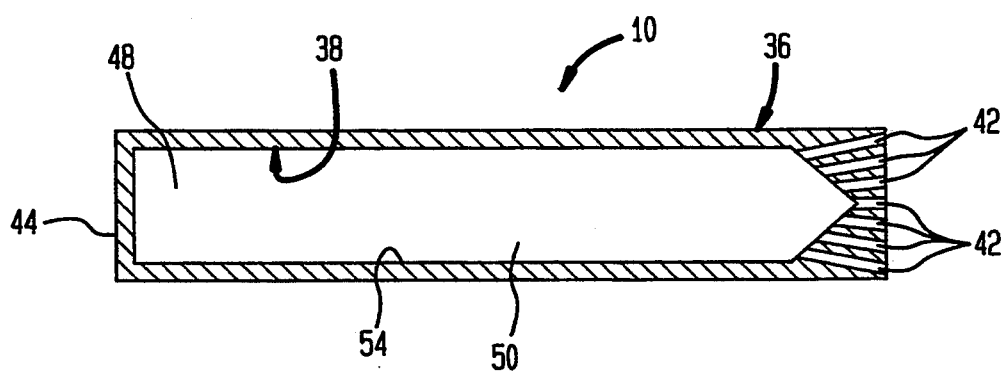
FIG. 5 is a cross-sectional view of the lance illustrated in FIG. 1 taken along line 5—5 of FIG. 3.

With reference to FIG. 3, lance 10 has an elongated body portion 36 of cylindrical configuration. Body portion 36 has an elongated passageway 38. Elongated passageway 38 terminates at one end, in a plurality of outwardly divergent main and booster jet discharge passages 40 and 42, respectively, which are formed by a plurality of bores defined in body portion 36. Elongated passageway 38 is sealed at the other end by a circular plate 44 welded to body member 36. Body member 36 is additionally provided with two inlets 46 and 48 communicating between the interior of elongated passageway 38 and quick connect-disconnect fittings 32 and 34. Additionally, elongated passageway 38 is divided in a lengthwise direction thereof by a rectangular dividing member 50 into two sub-passageways 52 and 54. Rate-enhancing gas, such as oxygen enriched gas flows into inlets 46 and 48, sub- passageways 52 and 54 and then out of main and booster jet discharge passages 40 and 42.

Figure 6:
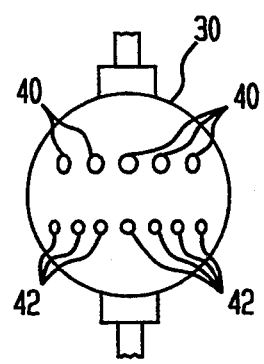
FIG. 6 is a front view of the lance illustrated in FIG.3.

With reference now to FIG. 6 it can be seen that five main jet discharge passages 40 are provided and seven booster jet discharge passages 42 are provided. Typically, in a plan view, main and booster jet discharge passages 40 and 42 diverge at fixed angles which can be selected to be an angle lying within a range of between about 10 and 40 degrees. Additionally, the total cross-sectional area of main jet discharge passages 40 is greater than that of booster jet discharge passages 42. Preferably, the total cross-sectional area of booster jet discharge passages 42 should be in a range of between about 0.05 and about 0.25 percent of the total cross-sectional area of main jet discharge passages 40.

The effect of the divergence of the main and booster jet discharge passages 40 and 42 is that a horizontally divergent, fan-shaped main jet is produced by rate-enhancing gas discharged from main jet discharge passages 40 and a booster or shield jet of rate-enhancing gas is discharged from booster jet passage 42 with the same configuration as the main jet. Preferably, the average velocity of the booster jet should be in a range of between about 2 and about 10 times the velocity of the main jet. Additionally, the main and booster jet discharge passages should be positioned with respect to one another such that the booster jet is adjacent the main jet. The distance between the plane of the booster jet and the main jet is most favorably such that interaction does not take place in the potential core region of both jets. In practice, this potential core is about 4–10 main nozzle diameters downstream. With typical jet expansion included angles of around 10°, the optimal distance between main and booster jet is between 3 and 10 main jet diameters. While not wishing to be held to any particular theory of operation, the difference in velocity and the close proximity of the main and booster jets causes combustion environment gases to entrain in the booster jet before the main jet to reduce the degree of entrainment in the main jet. As such, although the booster jet will eventually decay along with the main jet, the rate of decay of the main jet will be less than that which would otherwise occur if the booster jet were not present. As a consequence, the decay of the main jet is delayed and thus is able to influence the flame at a far greater distance than would be possible with the main jet alone.

In the illustrated embodiment, a burner 18 is situated above lance 10. It is to be mentioned that a burner and an oxidant lance in accordance with the present invention could be incorporated into a single unit. Moreover, the thermal load along with a lance in accordance with the present invention could be located beside the burner. Although main and booster jet discharge passages 40 and 42 are provided to produce the main and booster jets, rectangular, divergent, slot-like openings could be provided for the same purpose. The claims are meant to cover such eventualities.

It will be understood by those skilled in the art that numerous additions, changes, and omissions may be made without departing from the spirit and scope of the present invention which is set forth in the appended claims.

I claim:

1. A lance for injecting a rate-enhancing gas between a flame and a thermal load to augment combustion of fuel undergoing combustion in the flame, said lance comprising:

means for introducing a fan-shaped main jet between the flame and the thermal load, the main jet producing a low pressure field of the rate-enhancing gas between the flame and the thermal load to deform the flame into the shape of the main jet and to draw the flame toward the thermal load, the main jet decaying along its length due to entrainment of combustion-environment gas in the main jet; and booster jet means for introducing a fan-shaped booster jet of the rate-enhancing gas between the main jet and the thermal load, the booster jet having a higher velocity than the main jet;

the main jet means having a greater cross-sectional area than said booster jet means; and the main and booster jet means positioned so that said main and booster jets are oriented parallel to each other and in one direction, spaced apart to cause interaction between said main booster jets, outside of core regions thereof, and said booster jet is located sufficiently adjacent to said main jet to delay the decay of said main jet.

2. The lance of claim 1, wherein the main and booster jet means are formed within located at one end of an elongated body such that the main and booster jets emanate from the one end of the elongated body.

3. The lance of claim 2, wherein:

the body has two passageways;

the main and booster jet means comprising the one end of the elongated body having outwardly divergent main and booster jet discharge passages in communication with the two passageways; and the body also having inlet means in communication with the two passageways for introducing the rate-enhancing gas into the two passageways.

4. The lance of claim 3, wherein:

the body portion has an elongated passageway terminating at the one end thereof in a plurality of outwardly diverging bores to form the main and booster jet discharge passages and sealed at the opposite end;

a dividing member dividing the elongated passageway, in a lengthwise direction thereof into the two passageways; and the inlet means comprises a pair of upper and lower inlets in communication with the two passageways.

5. A method of injecting a rate-enhancing gas between a flame and a thermal load to augment combustion of fuel undergoing combustion in the flame, said nozzle comprising:

introducing a fan-shaped main jet between the flame and the thermal load, the main jet producing a low pressure field of the rate-enhancing gas between the flame and the thermal load to deform the flame into the shape of the main jet and to draw the flame toward the thermal load, the main jet decaying along its length due to entrainment of combustion-environment gas in the main jet; and introducing a fan-shaped booster jet of the rate-enhancing gas between the main jet and the thermal load so that said main and booster jets are oriented parallel to each other and in one direction and spaced apart to cause interaction between said main and booster jets, outside of core regions thereof, the booster jet having a higher velocity than the main jet and being introduced sufficiently adjacent the main jet that decay of the main jet is delayed.

* * * * *